Patented July 28, 1936

2,049,058

UNITED STATES PATENT OFFICE 2,049,058

PROCESS FOR PRODUCING WAX MODIFIERS AND PRODUCTS THEREOF

Anthony H. Gleason, Elizabeth, N. J., assignor to Standard Oil Development Company, a corporation of Delaware No Drawing. Application January 21, 1933, Serial No. 652,930

20 Claims. (Cl. 260—168)

The present invention relates to an improved process for producing wax modifiers and to the products thereof, and more especially for producing materials capable of favorably modifying waxy materials especially of the type found in petroleum oil fractions. My method will be more fully understood from the following description.

Petroleum oils frequently contain solid waxy hydrocarbons in appreciable quantities which cause them to solidify at temperatures well above 0° F., for example, as high at 30°, 40°, or even 50° F. It is desirable to reduce these pour or solidification points in order that the hydrocarbon oil may be useful as a lubricant at lower temperatures, and for this purpose substances known as pour inhibitors have been used. In some instances it is highly desirable to actually remove the wax from the oil. In the heavier cuts, waxes often have a very poorly defined crystal structure so that it is extremely difficult in many cases to remove it from the oil even after it has been solidified. I have also discovered a new method for preparing wax modifiers which are useful either as pour inhibitors or as separation aids. My materials are especially desirable in that they may be made to contain only the elements carbon and hydrogen and therefore do not become impurities in the oils to which they are added, but it will also be understood that they can be made according to my method so as to contain other elements such as oxygen or nitrogen. My wax modifier is also adapted to reduce pour points caused by solidification of material other than hydrocarbon waxes, for example, solid fatty acids, such as stearic, palmitic or similar acids or solid esters of such acids, or the acids produced by oxidation of paraffin wax, or of natural solid esters of the type of Japan wax and the like.

In producing my wax modifiers I first halogenate material of a paraffinic structure such as paraffin wax, petrolatum, ceresin, or ozocerite, and the halogenation, for example, chlorination, is preferably conducted so as to produce an intermediate containing, say, from 15 to 20% by weight of chlorin and therefore containing dichlor products to substantial extent. While this is the simplest way of producing chlorinated hydrocarbons, I may use a product produced by other means, for example, produced from polymerized divinyl acetylene by reaction with hydrochloric acid, or other similar materials. In any such case a chlorinated hydrocarbon of the type specified above results. Materials other than hydrocarbons which contain relatively long aliphatic and chiefly straight hydrocarbon chains may also be used and among these latter the heavier esters, ethers and the like having hydrocarbon chains of more than, say, ten carbon atoms are very useful. I prefer, however, to use hydrocarbons of the waxy type and to prepare the halides therefrom by bubbling chlorin, or bromin as the case may be, through the hydrocarbon material at temperatures of, say, 200–300° F.

To the halogenated paraffinic material I add a halocyclic compound, such as monochlor naphthalene, brombenzol, or the like, in which the halogen atom is attached to the ring, and while I prefer halo-derivatives of aromatic hydrocarbons, I may also use other halogen-containing materials such as hydrogenated haloaromatics, halophenol derivatives, naphthol derivatives, and the like, or halonaphthyl-, or benzyl-amino- derivatives and other nitrogen compounds. The condensation takes place preferably at low temperatures, say, below 150° F. or at a temperature as low as room temperature with condensation catalysts of the type of aluminum chloride and which include zinc chloride, boron fluoride, and the like, or other recognized condensation agents.

The condensation is carried out through a prolonged period of, say, four to six hours or more, with brisk agitation and at the end of the period the catalytic sludge is decomposed and removed either by settling or by the addition of hydrolyzing agents of the type of water, alkalis or acids. The solid inorganic product of the hydrolysis is removed and the oil distilled so as to remove unreacted constituents leaving a heavy residue with considerable residual halogen content. The second step of condensation then follows with a catalyst of the type of metallic sodium. It will be understood that materials other than sodium, e. g. the alkali metals may be used and in the ensuing reaction which takes place readily at a temperature from about 300–400°, the sodium halide is split out and may be removed from the oil by settling or otherwise. The sodium or other similar agent should be used in excess of the chlorin content in the intermediate product, so that the material produced is free from residual chlorin. The oily product may be subjected to the usual forms of purification such as acid wash, alkali treatment or treatment with clay.

The amount of the synthetic used for pour inhibiting depends on the character of the oil and the wax contained therein, and also on the potency of the particular batch of inhibitor. But ordinarily I have found that it may be used effectively in proportions of ½ to 2½% of the waxy oil to which it is added and less than 5% is ordinarily required to produce a depression of from 20 to 50° F.

When my materials are used as separation aids in cold settling or cold centrifuging processes, it is ordinarily added in proportion of from 0.1% to 1.0% based on the waxy oil and enables the operator to greatly increase the chilling rate over that ordinarily employed in oil refineries, e. g. a rate in excess of 10° or 25° or even 50° per hour can be used. Stocks which will not show any tendency to settling when diluted with naphtha settle quickly after the separation aid has been added. Operation of a centrifuge is also much improved when the material is added to the oil. A lower degree of dilution is required, chilling rates may be greatly increased, more complete separation of wax is obtained and better all-round operation is gained.

As an example of the manner in which my method of producing wax modifiers is carried out, the following experiment may be considered.

A hard paraffin wax with a melting point of 122° F. is chlorinated to about 15–20%, by passing chlorin through the molten wax until the specified gain in weight is noted. Then to 300 parts of the chlorinated product is added a fair excess, such as 500 parts by weight of brombenzol and 15 parts by weight of anhydrous aluminum chloride. The mass is agitated vigorously for four hours while a temperature of 100° F. is maintained, and at the end of this period a sufficient amount of alkali is added to hydrolyze the sludge. On settling the solid materials are removed and unreacted products are distilled off under vacuum leaving a residue comprising 150 parts by weight. To this dried residue 25 parts of metallic sodium is then added and the temperature is raised to 350–400° F. until reaction ceases.

After the removal of the excess of sodium and the solid sodium halide a very viscous oily material is collected.

When 2% of this material is added to an engine oil having a pour point of 25° F., a marked depression of pour point to 0° F. results.

When the same viscous condensation product is added to a heavy waxy oil in proportion of 1% and diluted with naphtha, it is found that the wax settles readily at low temperatures, although there is little tendency to settle in its absence.

My invention is not to be limited to any theory of the chemical reactions involved in the production of my improved wax modifiers, nor by any theories of its action either as a pour inhibitor or as a wax separation aid, nor is it to be limited to the use of any specific reaction materials or catalysts, but only to the following claims in which I wish to claim all novelty inherent in the invention.

I claim:

1. An improved process for producing a wax modifier, comprising first condensing a halide of an aliphatic organic compound having a long paraffin chain on a cyclic compound containing halogen attached to the ring, with removal of hydrogen halide, then producing further condensation with a metallic condensing reagent of the type of sodium adapted to remove residual halogens by combination therewith.

2. Process according to claim 1 in which the aliphatic compound used as a chlorinated solid waxy hydrocarbon.

3. Process according to claim 1 in which the aliphatic compound used is a halide of paraffin wax.

4. Process according to claim 1 in which the cyclic compound is a monohalo-hydrocarbon.

5. Process according to claim 1 in which the cyclic compound is a chlorinated aromatic hydrocarbon.

6. Process according to claim 1 in which the cyclic compound is monochlor naphthalene.

7. An improved process for producing a wax modifier comprising first condensing chlorinated waxy hydrocarbons with a halide of a cyclic hydrocarbon by means of a catalyst of the type of aluminum chloride, then producing a further condensation with removal of chlorine from the first condensation product by means of a metallic condensing reagent of the type of sodium which removes said chlorine by combination therewith.

8. Process according to claim 7, in which the chlorinated waxy hydrocarbon is paraffin wax chlorinated to about 15–20%.

9. Process according to claim 7 in which the catalyst sludge produced by the first condensation step is removed prior to the second condensation step.

10. Process according to claim 7 in which the product to be subjected to the second step of condensation is concentrated by distillation of the lighter fractions under vacuum.

11. A viscous oily condensation product of the reaction of a halide of an aliphatic organic compound having a long paraffin chain on a cyclic organic compound containing halogen attached to the ring, in the presence of a condensation agent of the type of aluminum chloride, which condensation product has undergone further condensation by contacting with a metallic condensing reagent of the type of sodium adapted to remove residual halogen by combination therewith.

12. Product according to claim 11 in which the aliphatic compound used is a chlorinated solid waxy hydrocarbon.

13. Product according to claim 11 in which the aliphatic compound used is a halide of paraffin wax.

14. Product according to claim 11 in which the cyclic compound used is a monohalohydrocarbon.

15. Product according to claim 11 in which the cyclic compound used is a chlorinated aromatic hydrocarbon.

16. Product according to claim 11 in which the cyclic compound used is a monochlor naphthalene.

17. A viscous oily hydrocarbon mixture produced by first condensing chlorinated waxy hydrocarbons with a halide of a cyclic hydrocarbon by means of a catalyst of the type of aluminum chloride and then producing a further condensation with removal of halogen from the first condensation product by means of a metallic condensing reagent of the type of sodium which removes said halogen by combination therewith.

18. Product according to claim 17 in which the chlorinated waxy hydrocarbon is paraffin wax containing about 15 to 20% chlorine.

19. Product according to claim 17 in which a catalyst sludge produced in said first condensation step is removed prior to the second condensation step.

20. Product according to claim 17 in which said mixture is freed of lighter fractions by distillation under vacuum.

ANTHONY H. GLEASON.